US010703321B2

(12) United States Patent
Deng et al.

(10) Patent No.: US 10,703,321 B2
(45) Date of Patent: Jul. 7, 2020

(54) AIRBAG ASSEMBLY (71) Applicant: Ford Global Technologies, LLC, Dearborn, MI (US)

(72) Inventors: Zhibing Deng, Northville, MI (US); Joseph Edward Abramczyk, Farmington Hills, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 213 days.

(21) Appl. No.: 15/818,629

(22) Filed: Nov. 20, 2017

(65) Prior Publication Data

US 2019/0152422 A1 May 23, 2019

(51) Int. Cl.
*B60R 21/231* (2011.01)
*B60R 21/207* (2006.01)
*B60R 21/233* (2006.01)
*B60R 21/2338* (2011.01)
*B60R 21/262* (2011.01)
*B60R 21/0136* (2006.01)
(Continued)

(52) U.S. Cl.
CPC .... *B60R 21/23138* (2013.01); *B60R 21/0136* (2013.01); *B60R 21/207* (2013.01); *B60R 21/233* (2013.01); *B60R 21/2338* (2013.01); *B60R 21/262* (2013.01); *B60R 21/268* (2013.01); *B60R 2021/01027* (2013.01); *B60R 2021/01286* (2013.01); *B60R 2021/23146* (2013.01); *B60R 2021/23161* (2013.01); *B60R 2021/23386* (2013.01)

(58) Field of Classification Search
CPC ... B60R 21/231; B60R 21/233; B60R 21/207; B60R 2021/23146; B60R 21/2078; B60R 2021/23153; B60R 2021/23138; B60R 21/2338; B60R 21/0136; B60R 21/262; B60R 2021/23161; B60R 2021/23386; B60R 2021/01286; B60R 2021/01027; B60R 21/268
See application file for complete search history.

(56) References Cited

U.S. PATENT DOCUMENTS 5,222,761 A * 6/1993 Kaji ...................... B60R 21/017
280/730.2
5,730,464 A * 3/1998 Hill ................... B60R 21/23138
280/730.2
(Continued)

FOREIGN PATENT DOCUMENTS

WO  2017014421 A1  1/2017

OTHER PUBLICATIONS

Zhu et al. article titled "Vortex Tube Heat Booster to Improve Performance of Heat Driven Cooling Cycles for Automotive Applications," SAE International Technical Paper #: 2016-01-0245, Published: Apr. 5, 2016.

*Primary Examiner* — Paul N Dickson
*Assistant Examiner* — Timothy Wilhelm
(74) *Attorney, Agent, or Firm* — Frank A. MacKenzie; Bejin Bieneman PLC (57) ABSTRACT

An airbag assembly includes a first airbag and a second airbag each inflatable to an inflated position, and a panel. In the inflated position, each of the first and second airbags have a bend, and first and second legs extending from the bend. The panel extends from the first airbag to the second airbag in the inflated position.

20 Claims, 8 Drawing Sheets (51) Int. Cl.
*B60R 21/01* (2006.01)
*B60R 21/268* (2011.01)

(56) References Cited

U.S. PATENT DOCUMENTS

| | | | | |
|---|---|---|---|---|
| 5,743,554 A * | 4/1998 | Friedrich | ............... | B60R 21/02 280/730.1 |
| 5,913,536 A * | 6/1999 | Brown | ............... | B60R 21/207 280/728.2 |
| 7,086,663 B2 * | 8/2006 | Honda | ............... | B60R 21/207 280/730.2 |
| 7,093,851 B2 * | 8/2006 | Lotspih | ............... | B60R 21/23138 280/730.2 |
| 7,168,733 B2 * | 1/2007 | Kumagai | ............... | B60R 21/207 280/730.2 |
| 7,484,757 B2 * | 2/2009 | Thomas | ............... | B60R 21/231 280/743.2 |
| 7,549,672 B2 * | 6/2009 | Sato | ............... | B60R 21/207 280/729 |
| 7,654,562 B2 * | 2/2010 | Klima | ............... | B60R 21/207 280/729 |
| 7,661,701 B2 * | 2/2010 | Hirata | ............... | B60R 21/232 280/730.2 |
| 7,828,322 B2 * | 11/2010 | Breuninger | ............... | B60R 21/231 280/730.2 |
| 7,896,386 B2 * | 3/2011 | Fukawatase | ............... | B60R 21/206 280/730.1 |
| 7,918,482 B2 * | 4/2011 | Sugimoto | ............... | B60R 21/207 280/729 |
| 7,942,440 B2 * | 5/2011 | Choi | ............... | B60R 21/231 280/729 |
| 7,997,615 B2 * | 8/2011 | Jang | ............... | B60R 21/231 280/730.1 |
| 8,210,566 B2 * | 7/2012 | Fukawatase | ............... | B60R 21/231 280/728.3 |
| 8,256,796 B2 | 9/2012 | Loibl et al. | | |
| 8,297,649 B2 * | 10/2012 | Enders | ............... | B60R 21/231 280/729 |
| 8,328,228 B2 * | 12/2012 | Lee | ............... | B60R 21/214 280/729 |
| 8,403,358 B2 * | 3/2013 | Choi | ............... | B60R 21/214 280/728.2 |
| 8,414,017 B2 * | 4/2013 | Lee | ............... | B60R 21/231 280/730.1 |
| 8,448,981 B2 * | 5/2013 | Fukawatase | ............... | B60R 21/207 280/730.2 |
| 8,469,395 B2 | 6/2013 | Richez et al. | | |
| 8,485,551 B2 * | 7/2013 | Dainese | ............... | B60R 21/207 280/730.1 |
| 8,579,321 B2 * | 11/2013 | Lee | ............... | B60R 21/214 280/729 |
| 8,596,674 B2 * | 12/2013 | Fukawatase | ............... | B60N 2/99 280/730.2 |
| 8,651,515 B2 * | 2/2014 | Baba | ............... | B60R 21/233 280/729 |
| 8,807,593 B2 * | 8/2014 | Lee | ............... | B60R 21/233 280/730.1 |
| 8,876,156 B2 * | 11/2014 | Turnbull | ............... | B60R 21/233 280/729 |
| 9,016,718 B2 * | 4/2015 | Fukawatase | ............... | B60R 21/233 280/730.2 |
| 9,132,798 B2 * | 9/2015 | Yasuoka | ............... | B60R 21/2334 |
| 9,290,151 B2 | 3/2016 | Fujiwara | | |
| 9,321,423 B2 * | 4/2016 | Jaradi | ............... | B60R 21/015 |
| 9,376,040 B2 * | 6/2016 | Fukawatase | ............... | B60N 2/4221 |
| 9,446,733 B2 * | 9/2016 | Pausch | ............... | B60R 21/231 |
| 9,533,648 B2 | 1/2017 | Fujiwara | | |
| 9,586,552 B1 * | 3/2017 | Whitens | ............... | B60R 21/207 |
| 9,688,232 B1 * | 6/2017 | Loew | ............... | B60R 21/207 |
| 9,827,939 B1 * | 11/2017 | Roychoudhury | ..... | B60R 21/239 |
| 9,950,687 B2 * | 4/2018 | Kato | ............... | B60R 21/207 |
| 9,981,624 B2 * | 5/2018 | Perlo | ............... | B60R 21/23138 |
| 9,994,181 B1 * | 6/2018 | Dubaisi | ............... | B60R 21/207 |
| 10,112,570 B2 * | 10/2018 | Barbat | ............... | B60N 2/90 |
| 10,173,629 B2 * | 1/2019 | Barbat | ............... | B60R 21/235 |
| 10,173,631 B2 * | 1/2019 | Perez Garcia | .... | B60R 21/23138 |
| 10,246,043 B2 * | 4/2019 | Schneider | ............... | B60R 21/214 |
| 10,272,866 B2 * | 4/2019 | Hiraiwa | ............... | B60R 21/2338 |
| 10,272,868 B2 * | 4/2019 | Jaradi | ............... | B60R 21/214 |
| 10,279,770 B2 * | 5/2019 | Faruque | ............... | B60R 21/0136 |
| 10,300,878 B2 * | 5/2019 | Park | ............... | B60R 21/207 |
| 10,336,278 B2 * | 7/2019 | Schneider | ............... | B60R 21/18 |
| 10,336,282 B2 * | 7/2019 | Fischer | ............... | B60R 21/231 |
| 10,336,283 B2 * | 7/2019 | Rickenbach | ............... | B60R 21/233 |
| 2007/0216142 A1 * | 9/2007 | Honda | ............... | B60R 21/207 280/730.2 |
| 2010/0140909 A1 * | 6/2010 | Jang | ............... | B60R 21/231 280/743.1 |
| 2013/0088056 A1 * | 4/2013 | Quatanens | ............... | B60R 21/233 297/216.13 |
| 2016/0001735 A1 * | 1/2016 | Quatanens | ............... | B60R 21/233 244/121 |
| 2017/0158160 A1 * | 6/2017 | Sugimori | ............... | B60R 21/207 |
| 2017/0174172 A1 * | 6/2017 | Burczyk | ............... | B60R 21/231 |
| 2017/0225788 A1 * | 8/2017 | Humbert | ............... | B60R 21/18 |
| 2018/0043852 A1 * | 2/2018 | Fischer | ............... | B60R 21/231 |
| 2018/0162310 A1 * | 6/2018 | Szawarski | ............... | B60R 21/237 |
| 2018/0319358 A1 * | 11/2018 | Schneider | ............... | B60R 21/233 |
| 2018/0354449 A1 * | 12/2018 | Markusic | ............... | B60R 21/23138 |
| 2018/0361978 A1 * | 12/2018 | Belwafa | ............... | B60R 21/233 |
| 2019/0077356 A1 * | 3/2019 | Patel | ............... | B60R 21/216 |
| 2019/0077359 A1 * | 3/2019 | Kim | ............... | B60R 21/23138 |
| 2019/0202391 A1 * | 7/2019 | Cho | ............... | B60R 21/214 |

* cited by examiner

AIRBAG ASSEMBLY

BACKGROUND

An interior of a vehicle, such as an automobile, may include various devices for absorbing energy from an occupant of the vehicle during an impact of the vehicle. For example, the vehicle may include one or more airbags supported by a seat, a steering wheel, and/or an instrument panel. During an impact, the airbags may be deployed to absorb energy from the occupant.

DETAILED DESCRIPTION

An airbag assembly includes a first airbag and a second airbag each inflatable to an inflated position. Each of the first and second airbags have a bend and first and second legs extending from the bend. The bend and the first and second legs of the first airbag are spaced from the bend and the first and second legs of the second airbag in the inflated position. A panel extends from the first airbag to the second airbag in the inflated position.

The first airbag and the second airbag may be generally U-shaped.

The first and second legs of the first and second airbags may be generally tubular.

The first and second legs of the first and second airbags may be generally parallel.

The first and second airbags each may have, and may be elongated between, a first end on the first leg and a second end on the second leg.

A tether may extend from the first end of the first airbag to at least one of the first and second ends of the second airbag.

A tether may extend from the first end of the first airbag to the second end of the first airbag, and another tether may extend from the first end of the second airbag to the second end of the second airbag.

The panel may extend from the bend of the first airbag to the bend of the second airbag.

The panel may extend from the first leg of the first airbag to the first leg of the second airbag. The panel may extend from the second leg of the first airbag to the second leg of the second airbag.

The second leg of the first airbag may be longer than the first leg of the first airbag. The second leg of the second airbag may be longer than the first leg of the second airbag.

An inflator may be in communication with the first and second airbags.

An inflatable tube may extend from the first airbag to the second airbag. The first and second airbags may each define an inflation chamber in communication with the inflatable tube.

A vehicle seat includes a seat back. An airbag assembly is mounted to the seat back and includes an airbag inflatable to an inflated position. The airbag in the inflated position has a bend. The first and second legs extends from the bend. The first and second legs and the bend are disposed in a generally horizontal plane.

A second airbag may be inflatable to an inflated position below and spaced from the airbag when the airbag is in the inflated position. The second airbag in the inflated position may have a bend. The first and second legs may extend from the bend of the second airbag.

A panel may extend generally vertically from the airbag to the second airbag when the airbag and the second airbag are in the inflated position.

The airbag may be generally U-shaped.

The first and second legs of the airbag may be generally tubular.

The first and second legs may be generally parallel. The first leg may be adjacent to the vehicle seat and the second leg may be farther away from the vehicle seat. The second leg may be longer than the first leg.

The airbag may have, and may be elongated between, a first end on the first leg and a second end on the second leg.

A tether may extend from the first end of the airbag to the second end of the airbag.

With reference to the Figures, wherein like numerals indicate like parts throughout the several views, an airbag assembly 10 for a vehicle 12 includes a plurality of airbags 14, e.g., a first airbag 16 and a second airbag 18, each inflatable to an inflated position. Each of the first airbag 16 and the second airbag 18 have a bend 20, and a first leg 22 and a second leg 24 extending from the bend 20. The bend 20, the first leg 22 and the second leg 24 of the first airbag 16 are spaced from the bend 20, the first leg 22 and the second leg 24 of the second airbag 18 in the inflated position. A panel 26 extends from the first airbag 16 to the second airbag 18 in the inflated position.

Figure 1:
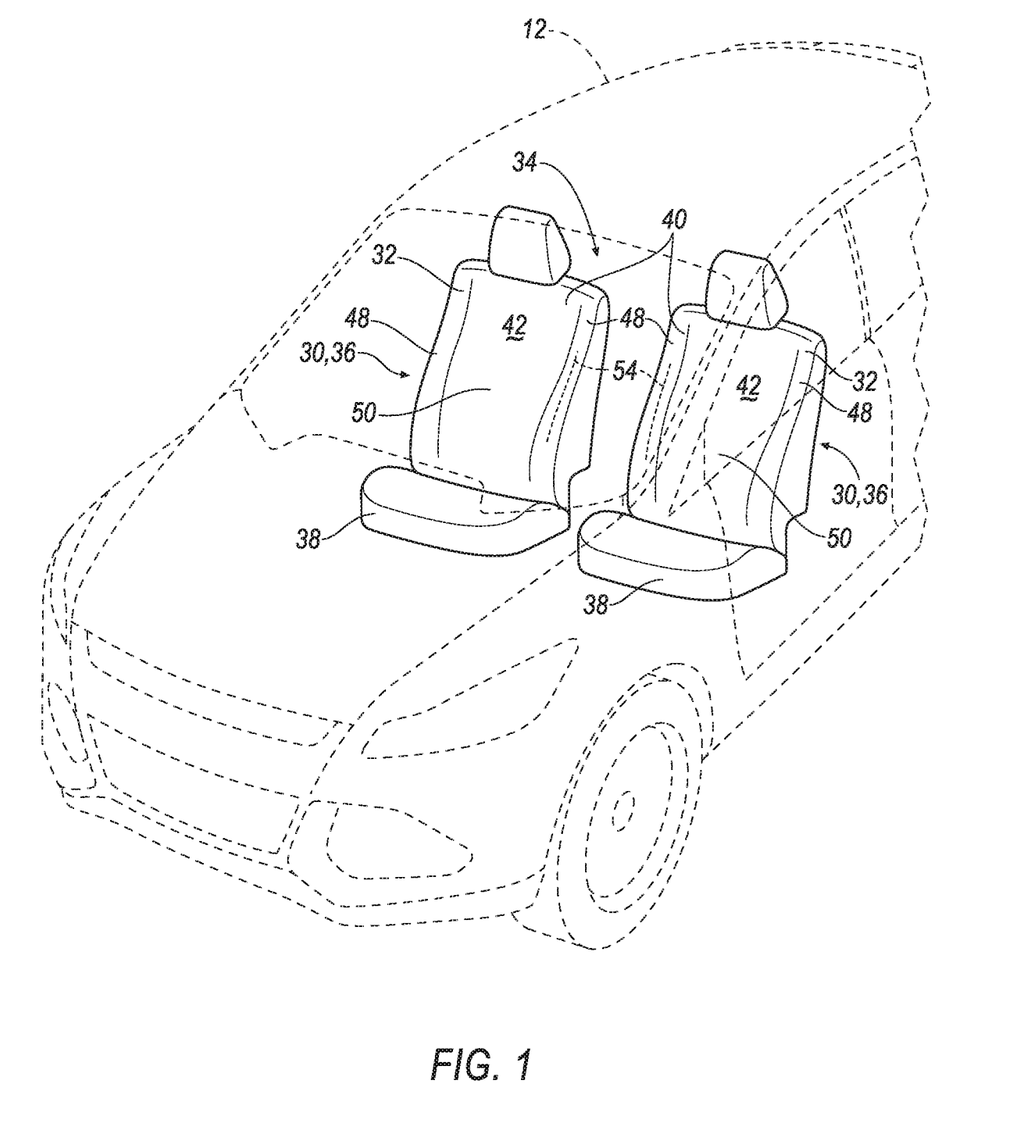
FIG. 1 is a perspective view of a vehicle including a left seat and a right seat.

The first airbag 16 and the second airbag 18 may be deployed from an uninflated position, as shown in FIG. 1, to the inflated position, as shown in FIGS. 2-8, in response to an impact of the vehicle 12, as described further below. The first airbag 16 and the second airbag 18 support the panel 26 while the first airbag 16 and the second airbag 18 are in the inflated position. Accordingly, the panel 26, in addition to the first airbag 16 and the second airbag 18, may absorb energy from an occupant impacting the airbag assembly 10 during a vehicle impact. The panel 26, extending from the first airbag 16 to the second airbag 18, increases the size of the airbag assembly 10 while minimizing the amount of inflation medium required to inflate the airbag assembly 10. In other words, the panel 26 is configured to absorb energy from an occupant during a vehicle impact, without inflation medium being directed to the panel 26 itself. This reduces the overall size of an inflator 28 in the airbag assembly 10 (discussed further below) that provides inflation medium to the first airbag 16 and the second airbag 18.

As set forth further below, the airbag assembly 10 may be a component of a seat assembly 30 of the vehicle 12 and may be mounted to a seat back 32 of the seat assembly 30, as in FIGS. 2 and 3. As set forth above, in the inflated position, the airbag assembly 10 may absorb energy from an occupant during a vehicle impact. Specifically, during an oblique or side impact of the vehicle 12, the occupant may be urged in a cross-vehicle direction. In such an example, a torso and/or an arm of the occupant may contact the airbag assembly 10, and the airbag assembly 10 catches the occupant to reduce or stop the cross-vehicle movement of the occupant and absorb energy from the occupant.

The vehicle 12 may be any suitable type of vehicle, e.g., an automobile, including a sedan, a pick-up truck, a sport-utility vehicle, etc. The vehicle 12 may be an autonomous vehicle. As shown in FIG. 1, the vehicle 12 includes a passenger cabin 34 to house occupants, if any, of the vehicle 12.

The passenger cabin 34 of the vehicle 12 includes one or more seat assemblies 30, i.e. vehicle seat assemblies 30. The seat assemblies 30 may be mounted in a fixed position. As another example, the seat assemblies 30 may be independently rotatable to a position facing each other. The seat assemblies 30 may be arranged as one or more front seat assemblies 36 disposed at a front of the passenger cabin 34 (as shown in FIGS. 1-3) and/or one or more back seat assemblies (not shown) disposed behind the front seat assemblies 36. The passenger cabin 34 may also include third-row seats (not shown) at a rear of the passenger cabin 34. In FIG. 1, the front seat assembly 36 is shown to be a bucket seat, but the seat assembly 30 may be other types. The position and orientation of the seat assembly 30 and components thereof may be adjustable by an occupant. In FIG. 1, as an example, the seat assemblies 30 are shown as front seat assemblies 36, and the airbag assembly 10 may be mounted to any style seat in any position in the vehicle 12.

Figure 2:
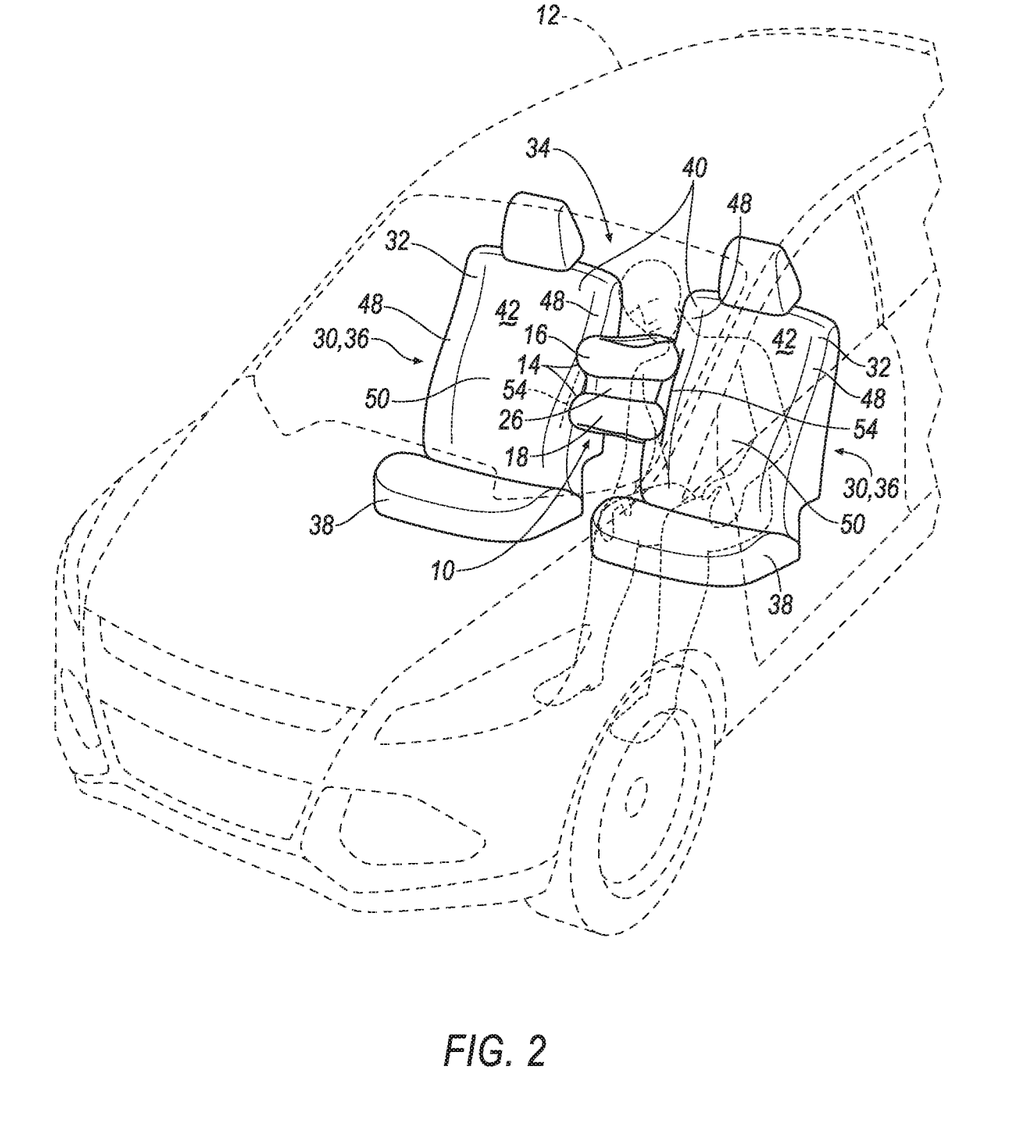
FIG. 2 is a perspective view of the vehicle with the left seat including an airbag assembly in an inflated position.
Figure 3:
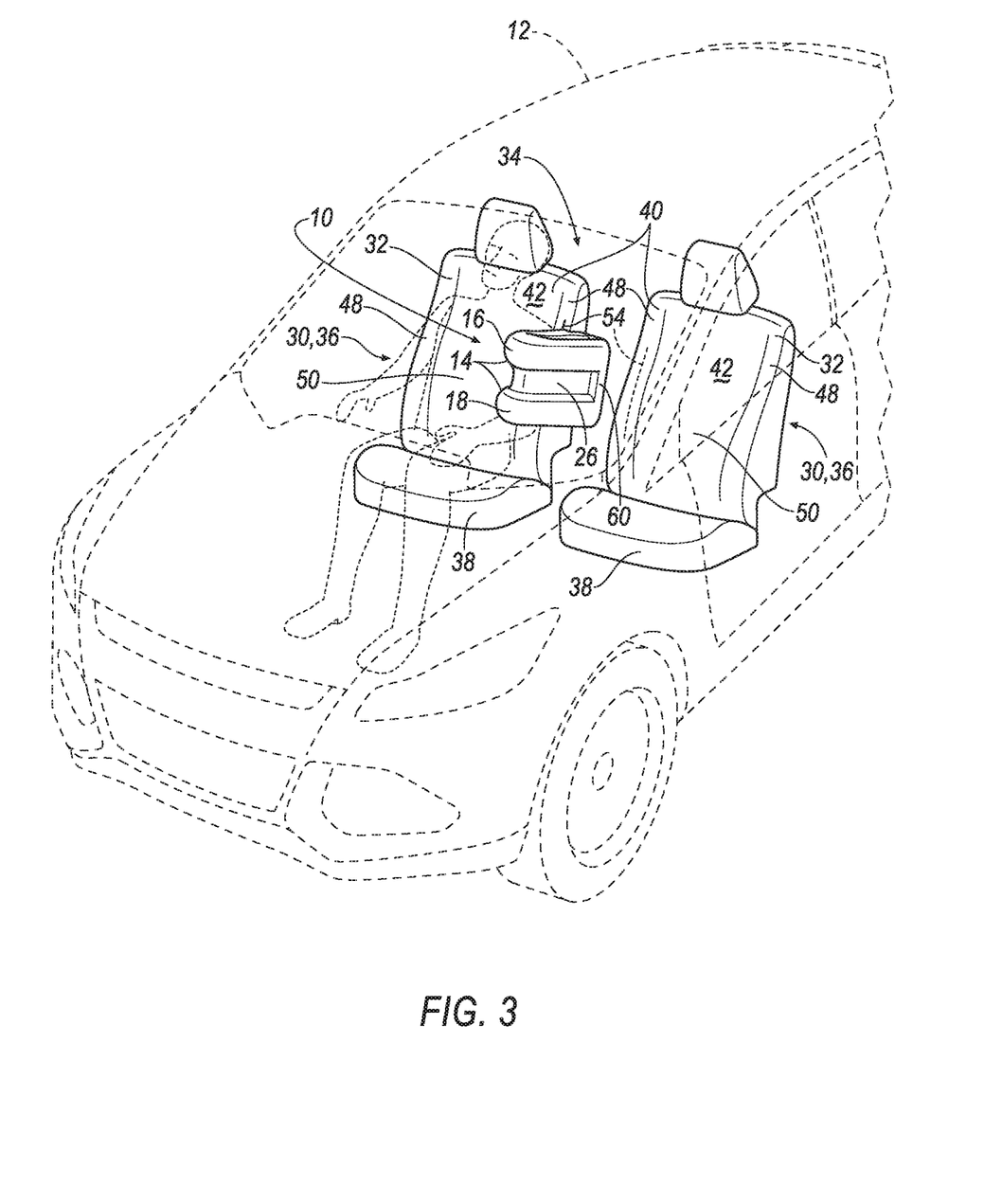
FIG. 3 is a perspective view of the vehicle with the right seat including an airbag assembly in the inflated position.
Figure 4:
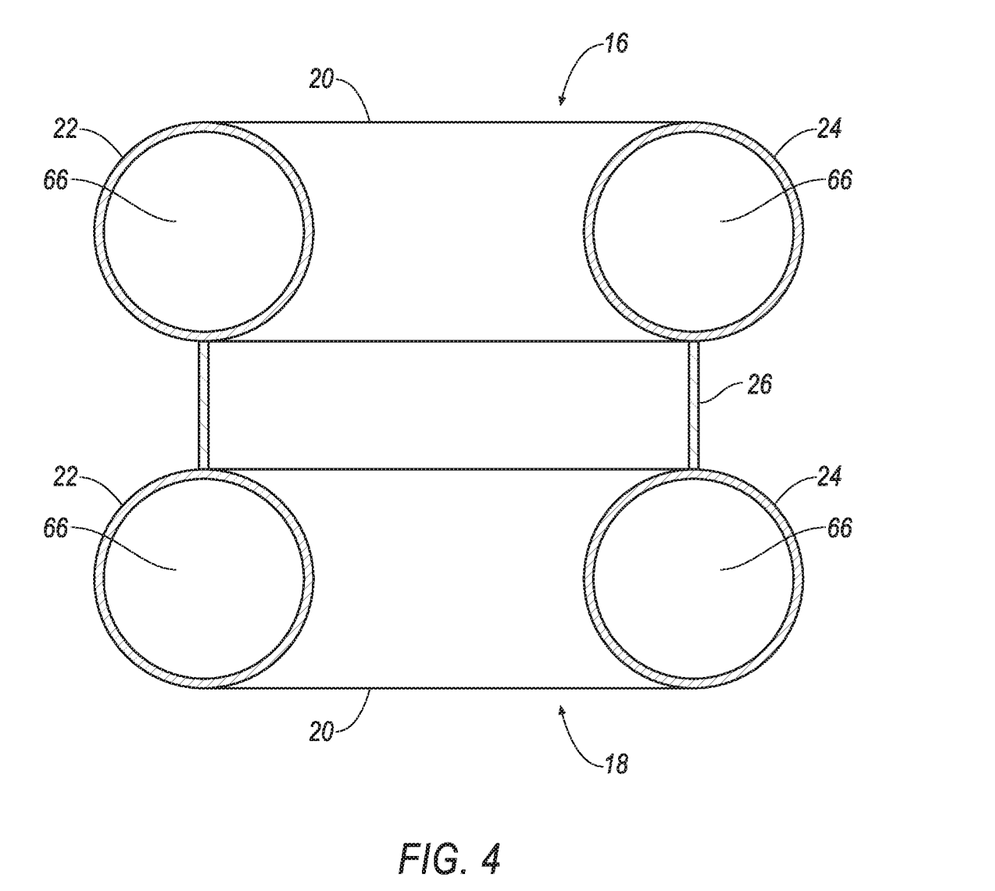
FIG. 4 is a cross-sectional view of the airbag assembly of FIG. 3.

With reference to FIGS. 1-3, each seat assembly 30 includes a seat bottom 38, and the seat back 32 is supported by the seat bottom 38. The seat back 32 extends upwardly from the seat bottom 38. The seat back 32 includes a frame 40. The frame 40 may include panels and/or tubes, beams, etc. The frame 40 may be formed of any suitable plastic material, e.g., carbon fiber reinforced plastic (CFRP), glass fiber-reinforced semi-finished thermoplastic composite (organosheet), etc. As another example, some or all components of the frame 40 may be formed of a suitable metal, e.g., steel, aluminum, etc.

The seat back 32 has a covering 42. The covering 42 may include padding (not shown) and/or upholstery (not shown). The padding is supported by the frame 40, and may be foam or any other suitable material. The upholstery may be cloth, leather, faux leather, or any other suitable material. The upholstery may be stitched in panels around the frame 40, padding, and bolsters 48.

With continued reference to FIGS. 1-3, the seat back 32 has two bolsters 48 and a support surface 50 extending from one of the bolsters 48 to the other of the bolsters 48. The seat back 32 may terminate at the bolsters 48. Specifically, the bolsters 48 define left and right boundaries of the seat back 32, and the support surface 50 extends therebetween to support the back of an occupant seated on the seat assembly 30. The bolsters 48 may extend along the seat back 32 upwardly from the seat bottom 38, and may extend in a vehicle-forward direction away from the support surface 50 to assist in maintaining an occupant on the support surface 50. The bolsters 48 may be foam or any other suitable material. The bolsters 48 may support an occupant laterally relative to the seat assembly 30.

The vehicle 12 may include any suitable number of airbag assemblies 10. For example, as shown in FIGS. 2 and 3, each seat assembly 30 may include one airbag assembly 10. As another example, each seat assembly 30 may include two airbag assemblies 10, e.g., one airbag assembly 10 at each bolster 48. As set forth above, the vehicle 12 may include any suitable number of seat assemblies 30 in any suitable position, and each seat assembly 30 may include one or more airbag assemblies 10. As one example, the seat assembly 30 may be fixed in a forward-facing direction, i.e., not swivelable, and the seat assembly 30 may include one airbag assembly 10 on an inboard one of the bolsters 48. As another example, the seat assembly 30 may be swivelable, and the seat assembly 30 may include two airbag assemblies 10, one on each bolster 48.

The airbag assembly 10 may include a housing 52, the inflator 28, at least one airbag (e.g., the first airbag 16, the second airbag 18, etc.) and the panel 26. The inflator 28 and the airbag 16, 18 may be disposed in the housing 52 in the uninflated position. The housing 52 provides a reaction surface for the airbag 16, 18 in the inflated position. The housing 52 may be supported by the frame 40 of the seat back 32 and may be connected to the frame 40 of the seat back 32 in any suitable fashion, e.g., with fasteners. The housing 52 may be formed of any material, e.g., a rigid polymer, a metal, a composite, etc.

In the uninflated position, the airbag assembly 10 may be positioned on one of the bolsters 48. As an example, the airbag assembly 10 may be disposed between the frame 40 and the covering 42. The seat back 32, e.g., the covering 42, may include a tear seam 54. The airbag assembly 10 breaks through the tear seam 54 as the airbag assembly 10 inflates to the inflated position. The tear seam 54 may be an area of weak material, a perforated area, etc., that enables the covering 42 to tear along the tear seam 54.

The airbag assembly 10 may include any suitable number of airbags 14, i.e., one or more. As an example, as shown in FIG. 2-7, the airbag assembly 10 includes two airbags 14. As another example, as shown in FIG. 8, the airbag assembly 10 includes three or more airbags 14. In examples where the airbag assembly 10 includes three or more airbags 14, the airbag assembly 10 includes more than one panel 26 with each panel 26 connecting adjacent ones of the airbags 14. In examples where the airbag assembly 10 includes more than one airbag 14 and/or panel 26, the airbags 14 and the panels 26, respectively, may be identical to each other, and common numerals are used to identify common features in the Figures.

As set forth above, in examples where the airbag assembly 10 includes more than one airbag 14, the airbags 14 are spaced from each other in the inflated position. For example, in an example where the airbag assembly 10 includes the first airbag 16 and the second airbag 18, the bend 20, the first leg 22 and the second leg 24 of the first airbag 16 are spaced from the bend 20, the first leg 22 and the second leg 24 of the second airbag 18 in the inflated position. In other words, the bend 20 of the first airbag 16 is spaced from the bend 20 of the second airbag 18, the first leg 22 of the first airbag 16 is spaced from the first leg 22 of the second airbag 18, and the second leg 24 of the first airbag 16 is spaced from the second leg 24 of the second airbag 18.

In the inflated position, each airbag 16, 18 has a tubular shape. As an example, each airbag 16, 18 may have a generally cylindrical cross-section. Each airbag 16, 18 has a first end 56 and a second end 58 and is elongated between the first end 56 and the second end 58. In other words, a width of the airbag 16, 18, e.g., a diameter, is less than the length of the airbag 16, 18 from the first end 56 to the second end 58.

The first leg 22 of each airbag 16, 18 is elongated from the bend 20 to the first end 56. The second leg 24 of airbag 16, 18 is elongated from the bend 20 to the second end 58. The first leg 22 and the second leg 24 of each airbag 16, 18, in the inflated position, are generally parallel to each other and spaced from each other. The first end 56 and second end 58 may spaced from each other when in the inflated position. This may position the second end 58 between two adjacent seat assemblies 30 to provide a reaction surface for the airbag assembly 10 in the inflated position. For example, as shown in FIG. 5, the airbag assembly 10 is supported on a right seat assembly 30, and the second end 58 is between the seat backs 32 of the right seat assembly 30 and a left seat assembly 30 such that, if an occupant of the right seat assembly 30 moves in a cross-vehicle 12 direction toward the left seat assembly 30, the second end 58 may be pinched against the left seat assembly 30 to support the bend 20.

With reference to FIGS. 2, 3, 7, and 8, the bend 20, the first leg 22, and the second leg 24 are disposed in a generally horizontal plane in the inflated position. In other words, the first leg 22 and the second leg 24 are positioned in a cross-vehicle direction from each other in the inflated position such that, when impacted by an occupant in the seat assembly 30, the first leg 22 impacts the second leg 24. Accordingly, some vertical variation may exist between the first leg 22 and the second leg 24, e.g., due to the rapid inflation of the airbags 14 and the flexible nature of the airbags 14, and the first leg 22 and the second leg 24 are positioned such that the first leg 22 impacts the second leg 24 when impacted by an occupant of the seat assembly 30. Since the bend 20, the first leg 22, and the second leg 24 are in a generally horizontal plane in the inflated position, the bend 20 extends about a generally vertical axis (not identified) in the inflated position.

Figure 5:
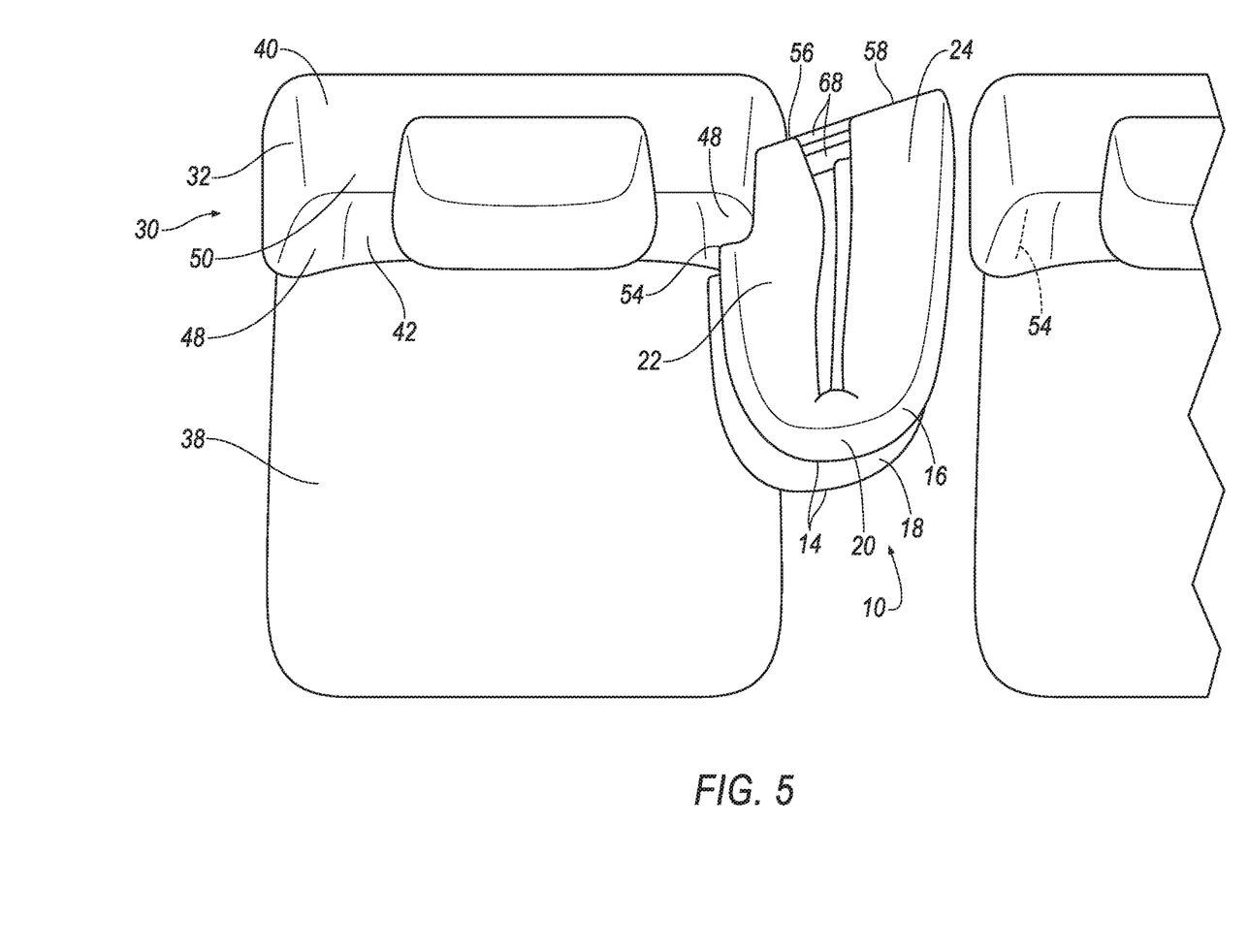
FIG. 5 is a top view of the seats of FIG. 3.

As shown in FIG. 5, the second end 58 may be in a vehicle-rearward position relative to the first end 56. For example, the second leg 24 may be longer than the first leg 22.

The bend 20 can be curved, as shown in FIGS. 2-8. As another example, the bend 20 may be angular. Each airbag 16 may be generally U-shaped in the inflated position. As another example, each airbag 16, 18 may be generally V-shaped in the inflated position.

Each airbag 16, 18 includes an inflation chamber 66. The inflation chamber 66 may be continuous from the first leg 22, through the bend 20, to the second leg 24. The panel 26 is exterior to the inflation chamber 66 and is not in communication with the inflation chamber 66, i.e., the panel 26 is not inflated. As set forth below, the inflator 28 may generate inflation medium that flows into the inflation chamber 66 and inflates the airbag 16, 18.

Each airbag 16, 18 may be formed of any suitable type of material, for example, a woven polymer. For example, each airbag 16, 18 may be formed of woven nylon yarn, such as nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Each airbag 16, 18 may include a plurality of segmented fabric (not shown), i.e., two or more pieces of material, that are separately formed and subsequently attached together, e.g., by stitching, welding, adhering, etc. As another example, each airbag 16, 18 may be monolithic, e.g., initially woven as a single piece of fabric.

As set forth above, the airbag assembly 10 includes at least one panel 26. For example, the panel 26 extends from the first airbag 16 to the second airbag 18 in the example shown in FIGS. 2-7. In other words, the panel 26 extends from the first leg 22 of the first airbag 16 to the first leg 22 of the second airbag 18, from the bend 20 of the first airbag 16 to the bend 20 of the second airbag 18, and from the second leg 24 of the first airbag 16 to the second leg 24 of the second airbag 18. When the airbag assembly 10 is inflated, the panel 26 may extend vertically from the first airbag 16 to the second airbag 18. As another example, the airbag assembly 10 may include a plurality of panels 26 extending between adjacent ones of the airbags 14, as shown in FIG. 8.

As one example, the panel 26 may extend continuously from the first ends 56 of the adjacent ones of the airbags 14 along the bends 20 of the adjacent ones of the airbags 14 to the second ends 58 of the adjacent ones of the airbags 14. As another example, the airbag assembly 10 may include a plurality of panels 26 spaced from each other and each extending between adjacent ones of the airbags 14, i.e., strips, strings, etc., that connect the first legs 22, the second legs 24, and/or the bends 20 of the adjacent ones of the airbags 14 together.

The panel 26 is drawn taut when the first airbag 16 and the second airbag 18 are inflated. The panel 26 is not inflatable. When drawn taut, the panel 26 may absorb energy from an occupant without having to inflate an additional airbag.

The panel 26 may be formed of any suitable type material. For example, the panel 26 may be formed of the same type of material as the airbags 14.

Figure 6:
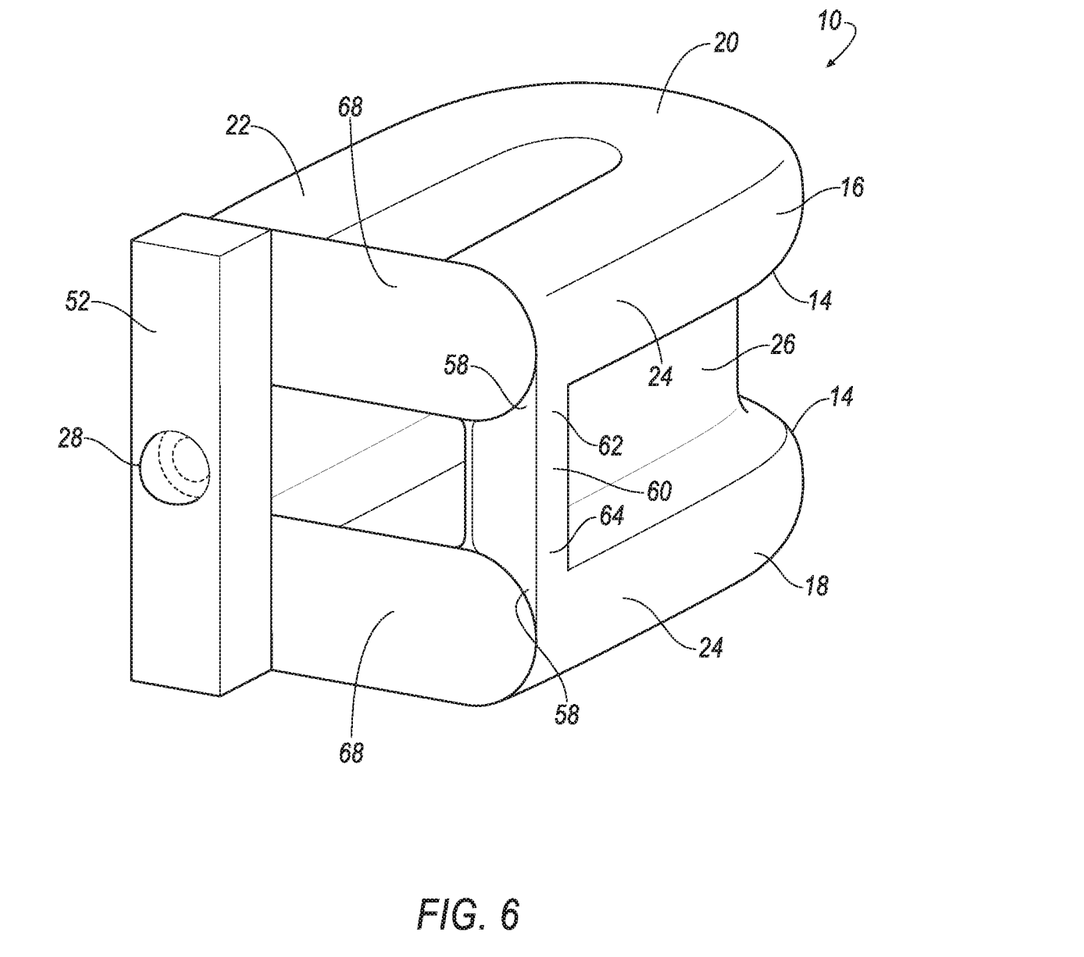
FIG. 6 is a perspective view of the airbag assembly in an inflated position.

The airbag assembly 10 may include a tether 68 extending from the first end 56 to the second end 58 of each airbag 16, 18. The airbag assembly 10 may include any suitable number of tethers 68, i.e., one or more. As shown in FIGS. 5 and 6, the airbag assembly 10 includes a tether 68 extend from the first end 56 of the first airbag 16 to the second end 58 of the first airbag 16, and another tether 68 extending from the first end 56 of the second airbag 18 to the second end 58 of the second airbag 18. The tether 68 may extend between any suitable portions of the airbag 16, 18. In the example, discussed above, the tether 68 extends from the first end 56 to the second end 58. As another example, the tether 68 may extend from the first leg 22 to the second leg 24 spaced from the first end 56 and the second end 58. As another example, the tether 68 may extend from the first end 56 of one airbag 16, 18 to the second end 58 of another airbag 16, 18.

Figure 7:
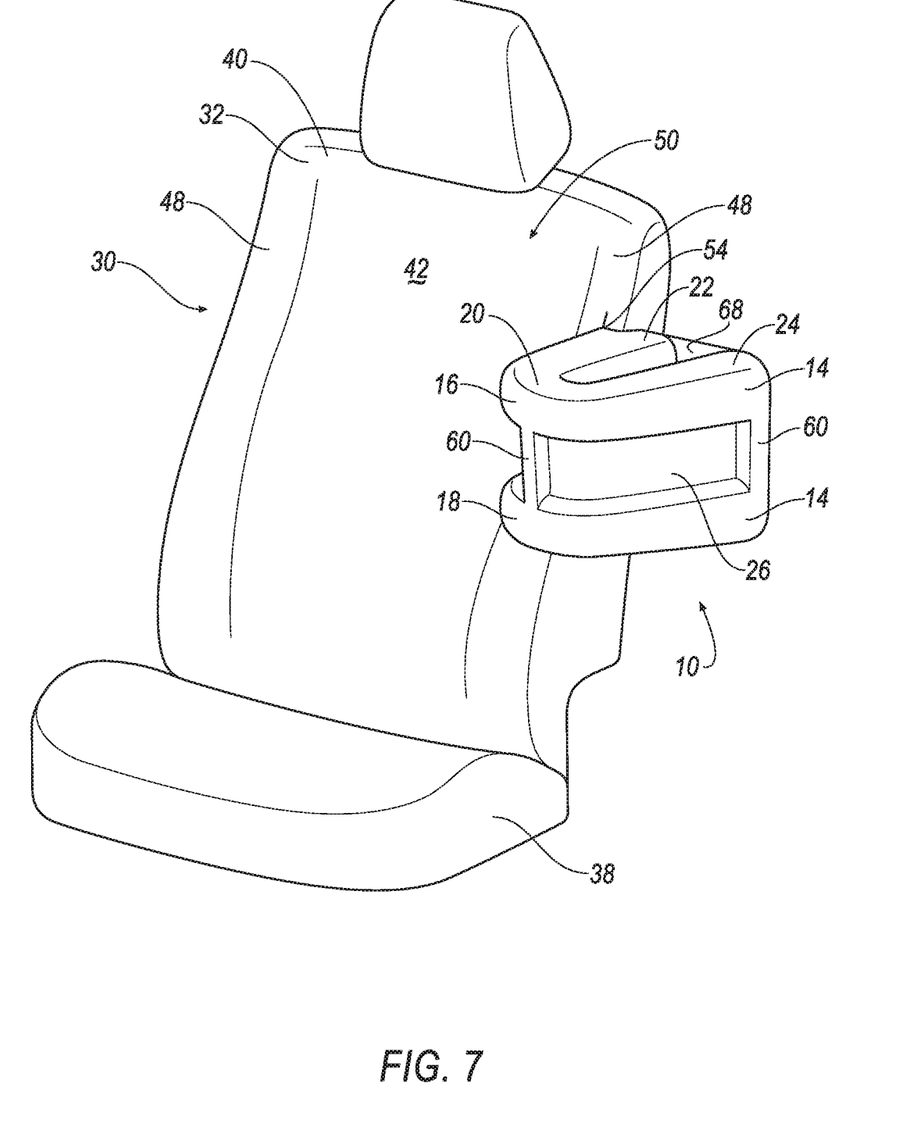
FIG. 7 is a perspective view of the left seat including another embodiment of the airbag assembly, including a vertical inflatable tube.
Figure 8:
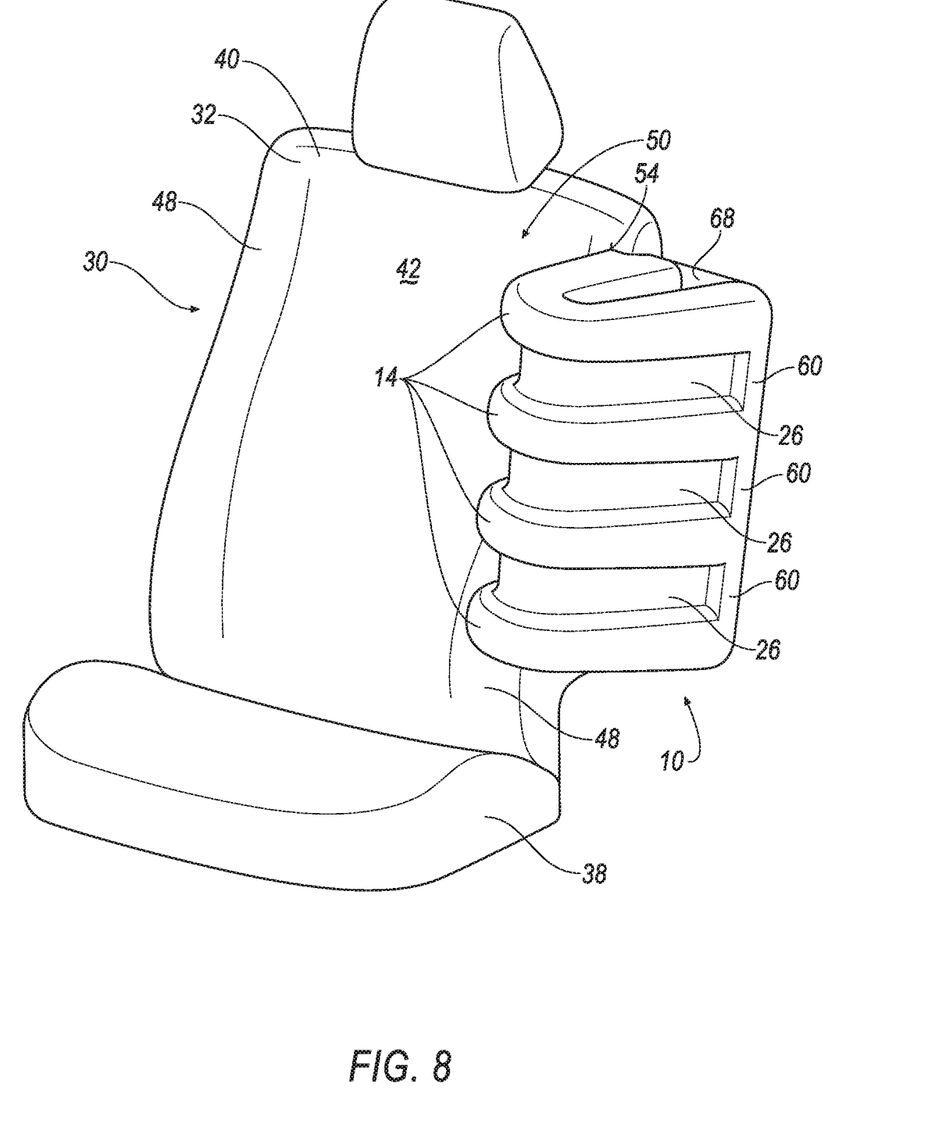
FIG. 8 is a perspective view of the left seat including another embodiment of the airbag assembly, including four airbags.

With reference to FIG. 7, the airbag assembly 10 may include one or more inflatable tubes 60 extending from one airbag to another airbag, e.g., from the first airbag 16 to the second airbag 18. The inflatable tube 60 has an upper portion 62 and a lower portion 64 and is elongated between the upper portion 62 and lower portion 64. The upper portion 62 is attached to the first airbag 16 and the lower portion 64 is attached to the second airbag 18. The inflatable tube 60 has an inflation chamber 66 that is in communication with the inflation chambers 66 of the first airbag 16 and the second airbag 18. In the inflated position, the inflatable tube 60 reinforces the separation between the first airbag 16 and the second airbag 18. One or more inflatable tubes 60 may extend between adjacent ones of the airbags 14 at any point on the airbag 16, 18. As shown in FIG. 7, for example, the inflatable tube 60 may extend from the bend 20 of one airbag 14 to the bend 20 of another airbag 14, e.g., from the first airbag 16 to the second airbag 18. As another example, as shown in FIGS. 3, 6, and 8, the inflatable tube 60 may extend from the second end 58 of one airbag 14 to the second end 58 of another airbag 14, e.g., from the second end 58 of the first airbag 16 to the second end 58 of the second airbag 18.

As set forth above, the airbag assembly 10 may include the inflator 28. The inflator 28 is in fluid communication with each of the first airbag 16 and the second airbag 18. An advantage of the airbag assembly 10 is the airbag assembly 10 provides a large surface area for absorbing energy from an occupant without the need for a relatively large inflatable airbag. Instead, the inflator 28 is required to inflate the relatively smaller inflation chambers 66 of the first airbag 16 and the second airbag 18. This means the airbag assembly 10 requires a relatively smaller inflator 28. The inflator 28 inflates each airbag 16, 18 from the uninflated position to the inflated position. The inflator 28 expands each airbag 16, 18 with inflation medium, such as a gas, to move the airbag 16, 18 from the uninflated position to the inflated position. Specifically, the inflator 28 may be in communication with the inflation chamber 66 to supply inflation medium to the inflation chamber 66.

The inflator 28 may be supported by the housing 52, as shown in FIG. 6, or may be disposed in any other suitable location. The inflator 28 may be, for example, a pyrotechnic inflator that uses a chemical reaction to drive the inflation medium into the airbag 16, 18. Alternatively, the inflator 28 may be, for example, a cold-gas inflator that, when activated, ignites a pyrotechnic charge that creates an opening for releasing the pressurized inflation medium to the airbag via a fill tube (not shown). Alternatively, the inflator 28 may be of any suitable type, for example, a hybrid inflator.

The vehicle 12 may include an impact sensing system (not shown). The impact sensing system may include an impact sensor and a controller. The controller is in communication with the inflator 28 and may include a processor (not shown) and a memory (not shown). The inflator 28 is programmed to inflate the airbag 16, 18. The memory stores instructions executable by the processor to control the inflator 28. The controller may be programmed to, upon identification of an impact, cause triggering of the inflator 28, causing the inflator 28 to generate inflatable medium and deploy the airbag 16, 18.

The impact sensor may be in communication with the controller to communicate data to the controller. The impact sensor may use e.g., accelerometers, radar, lidar, and/or a vision system. The vision system may include one or more cameras, CCD image sensors, and/or CMOS image sensors, etc. Based on data communicated by the impact sensor, the controller may cause triggering of the inflator 28.

To facilitate communications, the controller, the impact sensor, the inflator 28, and other components in the vehicle 12 may be connected to a communication bus, such as a controller area network (CAN) bus, of the vehicle 12. The controller may use information from the communication bus to control the triggering of the inflator 28. The inflator 28 may be connected to the controller or may be connected to the communication bus.

In operation, the airbag assembly 10 is in an uninflated position, as shown in FIG. 1, under normal operating conditions of the vehicle 12. When the impact sensor senses an impact of the vehicle 12, the impact sensing system triggers communication to the controller identifying the impact. In response to the type of impact sensed by the impact sensing system, the controller selectively instructs the inflator 28 to inflate the airbag assembly 10 with the inflation medium from the uninflated position to the inflated position. In the inflated position, the airbag assembly 10 may be impacted by an occupant, for example where an occupant moves in a vehicle-inboard direction, and the inflation chamber 66 may absorb energy from the occupant to stop or reduce movement of the occupant in the vehicle-inboard direction. Specifically, in an oblique or side impact of the vehicle 12, where an occupant may be urged in a cross-vehicle direction, e.g., the vehicle-inboard direction, the airbag assembly 10 may catch the occupant to reduce or stop the cross-vehicle movement of the occupant and absorb energy from the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly, comprising:
a housing;
a first airbag and a second airbag each supported by the housing and inflatable to an inflated position, each of the first and second airbags having a bend and first and second legs extending from the bend, the bend and the first and second legs of the first airbag being spaced from the bend and the first and second legs of the second airbag in the inflated position, the first legs spaced from each other in a vertical direction and the second legs spaced from the housing in a horizontal direction; and
a panel extending from the first airbag to the second airbag in the inflated position.

2. The airbag assembly as set forth in claim 1, wherein the first airbag and the second airbag are generally U-shaped.

3. The airbag assembly as set forth in claim 1, wherein the first and second legs of the first and second airbags are generally tubular.

4. The airbag assembly as set forth in claim 1, wherein the first and second legs of the first and second airbags are generally parallel.

5. The airbag assembly as set forth in claim 1, wherein the first and second airbags each have, and are elongated between, a first end on the first leg and a second end on the second leg.

6. The airbag assembly as set forth in claim 5, further comprising a tether extending from the first end of the first airbag to at least one of the first and second ends of the second airbag.

7. The airbag assembly as set forth in claim 5, further comprising a tether extending from the first end of the first airbag to the second end of the first airbag, and another tether extending from the first end of the second airbag to the second end of the second airbag.

8. The airbag assembly as set forth in claim 1, wherein the panel is not inflatable and extends from the bend of the first airbag to the bend of the second airbag.

9. The airbag assembly as set forth in claim 8, wherein the panel extends from the first leg of the first airbag to the first leg of the second airbag, and wherein the panel extends from the second leg of the first airbag to the second leg of the second airbag.

10. The airbag assembly as set forth in claim 1, wherein the second leg of the first airbag is longer than the first leg of the first airbag, and wherein the second leg of the second airbag is longer than the first leg of the second airbag.

11. The airbag assembly as set forth in claim 1, further comprising an inflator in communication with the first and second airbags.

12. The airbag assembly as set forth in claim 1, further comprising an inflatable tube extending from the first airbag to the second airbag, the first and second airbags each defining an inflation chamber in communication with the inflatable tube.

13. A vehicle seat, comprising:
a seat back;
an airbag assembly mounted to the seat back and including an airbag inflatable to an inflated position, the airbag in the inflated position extending from the seat back in a seat forward direction; and
the airbag in the inflated position having a bend, and first and second legs extending from the bend, the first and second legs and the bend being disposed in a generally horizontal plane the first leg adjacent the seat back and the second leg outboard of the first leg in a cross-seat direction.

14. The vehicle seat as set forth in claim 13, further comprising a second airbag inflatable to an inflated position below and spaced from the airbag when the airbag is in the inflated position, the second airbag in the inflated position having a bend, and first and second legs extending from the bend of the second airbag.

15. The vehicle seat as set forth in claim 14, further comprising a panel extending generally vertically from the airbag to the second airbag when the airbag and the second airbag are in the inflated position.

16. The vehicle seat as set forth in claim 13, wherein the airbag is generally U-shaped.

17. The vehicle seat as set forth in claim 13, wherein the first and second legs of the airbag are generally tubular.

18. The vehicle seat as set forth in claim 13, wherein the first and second legs are generally parallel, and the second leg is longer than the first leg.

19. The vehicle seat as set forth in claim 13, wherein the airbag has, and is elongated between, a first end on the first leg and a second end on the second leg.

20. The vehicle seat as set forth in claim 19, further comprising a tether extending from the first end of the airbag to the second end of the airbag.

* * * * *

UNITED STATES PATENT AND TRADEMARK OFFICE
CERTIFICATE OF CORRECTION

PATENT NO. : 10,703,321 B2
APPLICATION NO. : 15/818629
DATED : July 7, 2020
INVENTOR(S) : Zhibing Deng et al.

Page 1 of 1

It is certified that error appears in the above-identified patent and that said Letters Patent is hereby corrected as shown below:

In the Claims

Column 9, in Line 13, replace "horizontal plane the first leg adjacent" with — horizontal plane, the first leg adjacent —.

Signed and Sealed this
First Day of December, 2020

Andrei Iancu
*Director of the United States Patent and Trademark Office*